Figure 1:
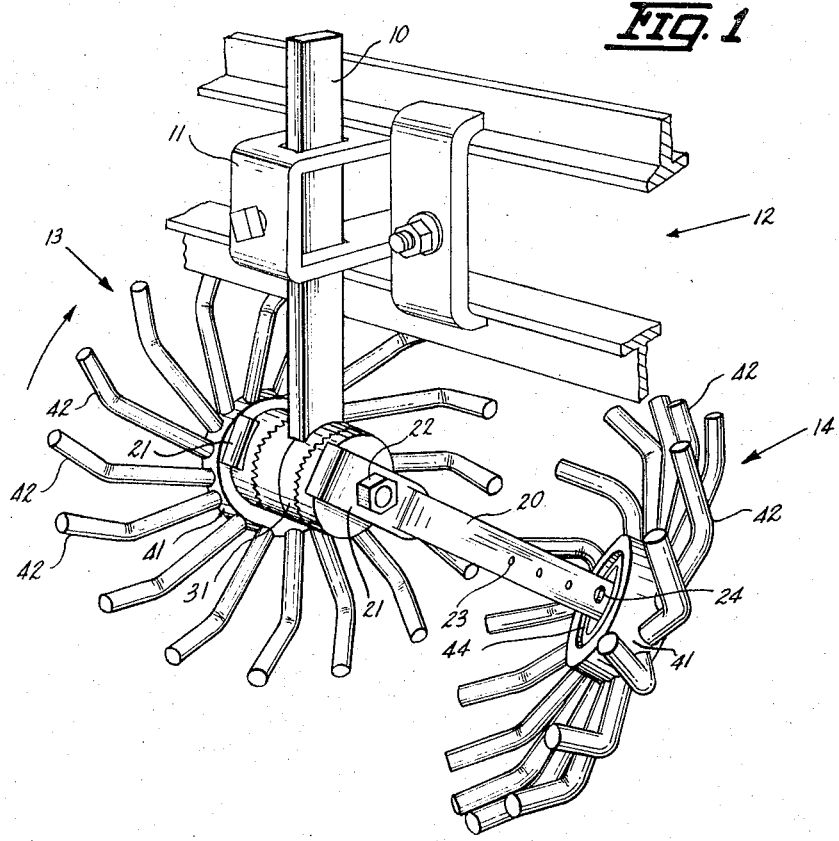

INVENTOR.
ROLAND EUGENE BUSH
BY Corey & Corey
ATTORNEYS.

Feb. 28, 1967   R. E. BUSH   3,306,371
ROTARY CULTIVATORS
Filed June 14, 1965   2 Sheets-Sheet 2
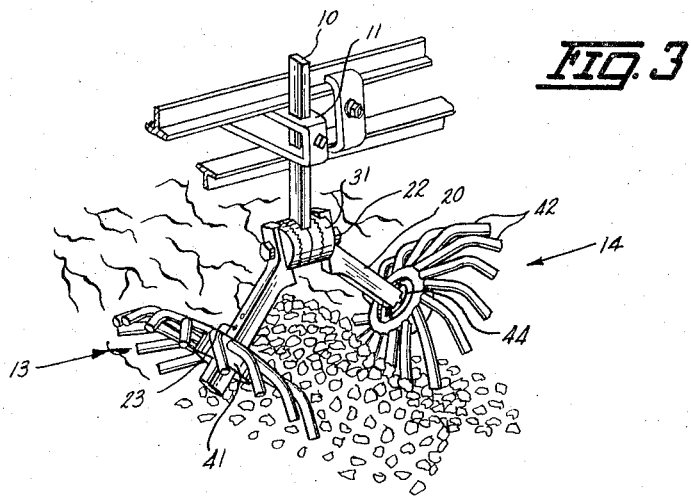
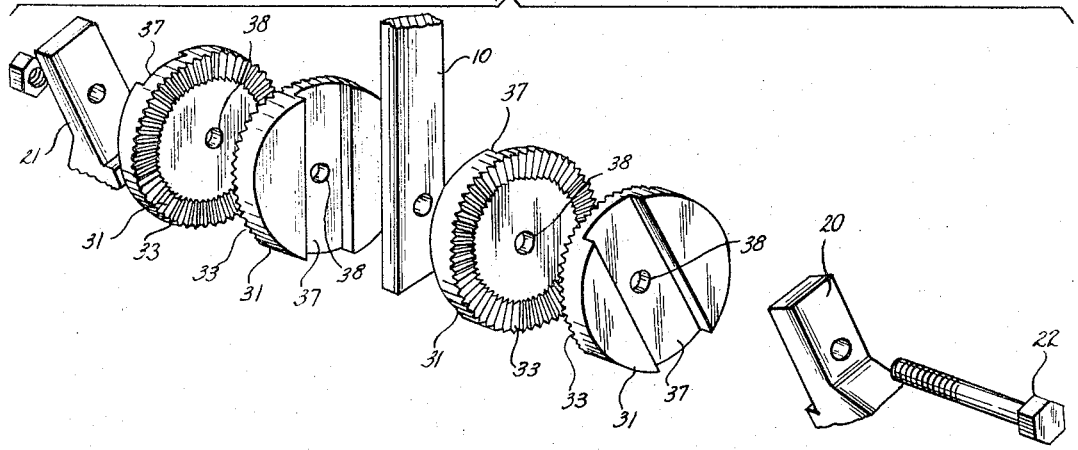
INVENTOR.
ROLAND EUGENE BUSH
BY Corey & Corey
ATTORNEYS.

United States Patent Office 3,306,371
Patented Feb. 28, 1967

3,306,371
ROTARY CULTIVATORS
Roland Eugene Bush, P.O. Box 3992, 3rd and O Sts.,
Lincoln, Nebr. 68505
Filed June 14, 1965, Ser. No. 463,787
1 Claim. (Cl. 172—540)

This invention relates to agricultural implements and has particular relation to a rotary cultivator.

In cultivation, particularly of plants in the early stages of growth, it is necessary to keep the soil broken up so that moisture and fertilizers can reach the plant root systems and the dirt manipulated about the plant as desired to secure both breaking up of the surface and arrangement of the dirt about the plant to promote best growth. Crusting of the earth occurs and this must be broken up and, further, weeds and the like must be removed.

One of the main objects of my invention is to provide new and novel methods of cultivation and a cultivator instrument which is easily adjusted and attached to any cultivation machine or tractor or the like and which may be readily changed for various operations, including mulching dirt to and from the row or pushing dirt up from under the plant, or mulching the soil in the row, or killing weeds in the row without disturbing or harming the plant root system.

Among the primary objects of my invention is to increase the versatility and uses of a rotary cultivator by providing new and novel mounting means of the toothed wheels and the construction of the wheels themselves.

Another object of my invention is to provide a rotary cultivator wheel which can be positioned in at least two positions, reversed one from the other, so that in one position a punching-scouring action of the wheel is attained in the earth and in the other the wheel is reversed to present the broader side of the teeth to the earth to break up the crust and like operations.

Another object of my invention is to provide a wheel mounting system so that single units or pairs may be employed, or even gangs of pairs and wheels.

Still another object of my invention is to provide a wheel-type cultivator which can be readily attached to various cultivating implements as the main cultivating means or as an accessory cultivating means in connection with other cultivating methods.

Still another object of my invention is to provide means for tilting the wheels as desired, forward or rearwardly, and for adjusting their spacing relative to one another and for reversing them with respect to each other.

Still other objects are to provide means by which dirt can be either carried up under the plant and broken at the same time, or by which the dirt can be carried away from the plant to build up the hills about the plant and lower troughs between the hills.

Still another object of the invention is to provide a unique universal mounting for the cultivator wheels in which only one form of element performs the function of securing the wheel axles to the mounting shank by which the cultivator is mounted on a cultivating tool.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

FIGURE 1 is a view in perspective of a cultivator constructed according to one embodiment of my invention as it appears when attached to the frame of a cultivating instrument, which is in turn drawn by a tractor or other power source. The tines point inwardly and the wheels are in a leading position.

Figure 2:
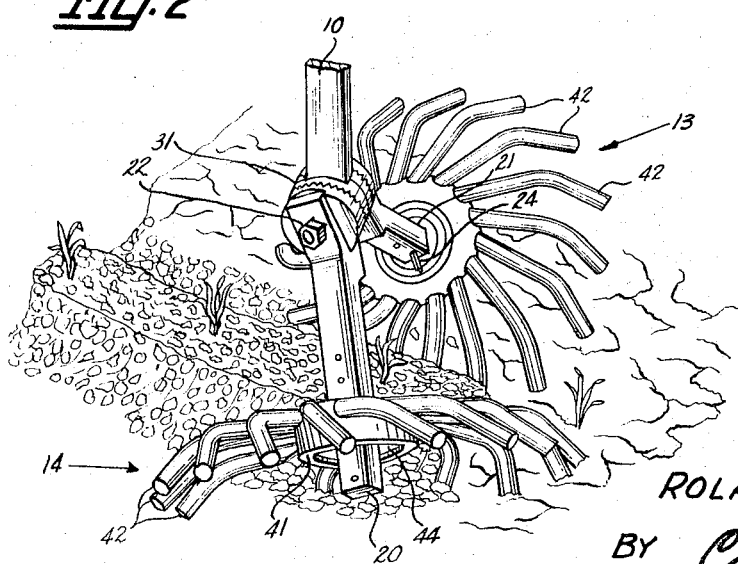

FIGURE 2 is a view of the cultivator as it is positioned to carry dirt away from the plants and form a trough on either side of the row of plants. The tines are reversed from FIGURE 1 and point outwardly. The wheels are in a leading position.

FIGURE 3 illustrates the position of the cultivator wheels in a trailing condition, which lifts the dirt up toward the row with a spacing-lifting action, and FIGURE 4 is an exploded perspective of the mounting arrangement.

Referring now to the drawings:

A wheeled cultivator constructed according to one embodiment of my invention includes a mounting shank 10, usually rectangular in cross section and usually positioned in the vertical position here shown and which may be attached at its upper portion by means of a clamp or other securing device 11 to the frame 12 of a drawn cultivating instrument.

I preferably employ two cultivating wheels 13 and 14, hereinafter more particularly described, and these wheels are mounted on shafts including an axle 20, preferably square in section, welded or otherwise secured to a plate or axle shank 21 similar in cross section to the shank 10, with the axles extending at an angle of approximately 45 degrees with reference to the plate 21. The plate 21 is provided with a hole therethrough so that it may be secured in place by means of a bolt and nut 22. The axles or stub shafts 20 are provided with a series of pin openings 23 therethrough so that the hub may be positioned anywhere along the shaft by means of cotter pins 24, one on either side of the respective hubs.

An important and unique portion of the mounting arrangement is the disc 31 having a plurality of radial splines 33 on one side, and a buttressed slot 37 on the other side. A hole 38 for the bolt 22 is provided in the center of the disc.

In assembling the cultivator, of course only two of these mounting discs might be employed and only one cultivator wheel and shaft, and the cultivator shank might be vertical or horizontal. But in a preferred mounting the cultivator wheels are employed in pairs as illustrated in FIGURES 1, 2 and 3, and four of the mounting discs or plates are employed. These are employed in pairs on either side of the shank with the two inner discs located with their grooves or slots 37 faced inwardly to embrace the shank 10, and the outermost discs placed with the splines 33 adjacent the splines of the inner discs and with the grooves positioned outwardly to receive the two shanks 21 or plates 21 of the wheel axle mounts 20. The bolt 22 of course secures these seven members in relation with one another so that the cultivator wheel axles are firmly held in any desired position of tilt as later described. The grooves hold the axles and the shank in place and the splines hold the adjacent discs in the desired position.

The wheels include tube sections or hubs 41 to which the tines or rods 42, which form the earth working portions of the cultivator, are welded or otherwise secured. It is to be noted, by reference to FIGURE 1, that these tines are tangentially rather than radially mounted on the tube or hub 41 and that they are attached closer to one edge of the hub than to the other and slope slightly through their inner portion toward the exposed side of the hub—that is, the tines are attached close to one edge of the hub and slope slightly laterally toward the other edge of the hub. Their outer ends slope still more markedly for approximately one-third their length and over what might be termed the inner edge of the hubs, and the effect of the tangential mounting and tangential positioning is apparent in the drawings.

An outer race is mounted at 43 within the hub 41 and the inner hub or race 44 is provided with a square opening 45 therethrough so that the hub may be positioned at any point on the square shank or axle, and thus the pairs of tined wheels may be positioned at any desired point along the axles, or may be reversed from the inwardly sloping position of FIGURE 1 to the outwardly sloping position of FIGURE 2, merely by removing the outer cotter pins, removing the wheels, and again positioning them on the axles.

Suitable grease seals are provided for the bearings, as they must operate under extreme conditions of dust and dirt and gritty sand and the like.

In operation, say with the tines sloping inwardly as shown in FIGURE 1, the toothed wheels will rotate in a clockwise direction when viewed from the right as the cultivator is drawn forward along the ground. Note, however, that the forward inclination of the two shafts will cause the tines to follow a sort of herringbone path with regard to the earth and that the end of a given tine will enter the earth as the device moves forward or to the right at a position closest to its companion wheel. As the tine is pushed deeper into the earth and as it passes below the axle, its influence on the entering and leaving tines is greatest at the lowest point, but the tine is being pushed outwardly by the cog wheel effect of the rest of the tines.

The tines having the greatest penetration will have the greatest influence on the other tines, but the tines are caused by rotation of the toothed wheel to move outwardly on the ground as well as downwardly, and then upwardly but at a lower point, so as to carry dirt away from the portion of the ground between the wheels, and if the wheels are spaced apart, to clear the plant and the scarifying and trough-forming motion of the tines causes the earth to become broken up and scarified at the same time in a herringbone pattern without disturbing the plants.

The position shown in FIGURE 1 would be most conducive to breaking up of the ground.

In FIGURE 2 it is to be noted that the position of the tined wheels has now been reversed and that the tines face outwardly from each other. The axles slope slightly forward and the cultivator is being moved from left to right. This position causes the greatest movement of the earth and the earth is caused to be drawn away from the hill in which the plants are located and a trough to be formed on either side of the plant. Note that in both FIGURES 1 and 2 the axles are sloping forward.

In FIGURE 3 the cultivator is moving from right to left. The shafts slope rearwardly. The tined wheels are placed on the axles to face outwardly and the effect of movement of the cultivator is to bring earth from the trough up under the leaves of the plants.

In operation, single wheels or a plurality of single wheels mounted on a plurality of shanks might be employed, and if the wheels were inclined at least slightly away from the direction of motion, a herringbone scarifying action could be secured, particularly if rows of wheels were mounted in staggered relation in front of each other, as well as transversely of the path of movement.

More particularly, however, and most desirably the wheels are employed in pairs since it is usually desirable to either move toward the plant or away from it to cause the earth to be built up around the plant or carried away from it into the troughs.

Preferably, the axes of the seven members as shown in FIGURES 1 and 3 and particularly in FIGURE 4, is a line in horizontal relation as shown and transverse to the direction of motion of the cultivator framework, whereby the angled arms 20, as they are rotated about the axis, will cause the hubs of the cultivator wheels, which are preferably held in parallel relation, to describe an arcuate path, and because of the tilted radial position of the teeth, will be positioned so that the plane of the cultivator wheels is tilted forward or back as desired to produce either pulling of the ground away from the plants in forward position, and bringing it in toward the plants in the rearward position, or causing scarifying action in the intermediate positions.

Although I have described a specific embodiment of my invention it is apparent that modifications thereof may be made by those skilled in the art. Such modifications may be made without departing from the spirit and scope of my invention as set forth in the appended claim.

I claim as my invention:

In a rotary cultivator, a mounting shank, a pair of washer-like discs grooved on one side of each to receive the shank when positioned with the grooved faces together thus providing a transverse axis and provided with a plurality of radial splines on the other, a second set of washer-like discs like the first set grooved on one side and radially splined on the other whereby when the second set is aligned with the first with the splines on the inside, the grooves of each of the second set of discs is engaged respectively with the splines of the first set whereby the second set of discs may be received on the first set in a multiplicity of radial positions whereby the grooves on the outside of the second set of discs may be positioned in a large number of radial positions, a pair of cultivator wheel supports including shanks received in the oppositely disposed grooves of the outer discs and having axles extending at approximately forty-five degrees to the shanks, a fastening means to hold the discs and shanks in transverse aligned relation, cultivator wheels mounted for rotation on the axles including hubs slidably and reversibly positionable on the axles and the wheels having a plurality of radially and tangentially disposed tines extending therefrom, the tines being formed in bent dish-shaped relation whereby the last named shanks and the wheels thereon may be positioned with the shanks inclined forwardly or rearwardly at any desired position and the wheels reversed in any of the positions when the cultivator is drawn along the ground with the tined wheels presented to the ground to produce any desired lifting, pushing or scarifying action.

References Cited by the Examiner

UNITED STATES PATENTS

| | | | |
|---|---|---|---|
| 500,349 | 6/1893 | Pridmore | 172—177 |
| 1,244,982 | 10/1917 | Horst | 172—556 X |
| 1,252,658 | 1/1918 | Butler | 172—603 X |
| 1,627,277 | 5/1927 | Craig | 172—518 X |
| 1,642,261 | 9/1927 | Patterson | 172—556 |
| 2,882,982 | 4/1959 | Hobbs | 172—551 X |
| 3,082,829 | 3/1963 | Buddingh et al. | 172—184 |
| 3,173,498 | 3/1965 | Heilbrun | 172—540 |
| 3,203,487 | 9/1965 | Whitesides | 172—548 |

FOREIGN PATENTS

| | | |
|---|---|---|
| 143,393 | 5/1900 | Germany. |
| 249,297 | 4/1948 | Switzerland. |
| 359,918 | 3/1962 | Switzerland. |
| 377,577 | 6/1964 | Switzerland. |

ANTONIO F. GUIDA, *Acting Primary Examiner.*

ABRAHAM G. STONE, JOE O. BOLT, JR., *Examiners.*

J. R. OAKS, *Assistant Examiner.*